United States Patent [19]
Cutler

[11] 3,725,651
[45] Apr. 3, 1973

[54] NUMERICAL CONTROL SYSTEM FOR A LATHE
[75] Inventor: Hymie Cutler, Detroit, Mich.
[73] Assignee: The Bendix Corporation, Southfied, Mich.
[22] Filed: Aug. 5, 1970
[21] Appl. No.: 62,231

[52] U.S. Cl. .............235/151.11, 318/569, 318/571, 318/573, 318/39
[51] Int. Cl. ...............................................G06f 15/46
[58] Field of Search................................235/151.11; 318/567–574, 600, 603, 35, 39, 51

[56] References Cited

UNITED STATES PATENTS

| | | | |
|---|---|---|---|
| 3,573,588 | 4/1971 | Geyer et al. | 318/571 |
| 3,325,710 | 6/1967 | Reynolds | 318/39 |
| 3,548,172 | 12/1970 | Centner et al. | 235/151.11 |
| 3,218,532 | 11/1965 | Toscano | 318/569 X |
| 3,191,205 | 6/1965 | Gilbert | 318/39 X |
| 3,270,186 | 8/1966 | Centner | 235/151.11 |
| 3,418,549 | 12/1968 | Emerson et al. | 318/571 X |
| 3,449,554 | 6/1969 | Kelling | 318/568 X |

Primary Examiner—Malcolm A. Morrison
Assistant Examiner—Jerry Smith
Attorney—William F. Thornton, McGlynn, Reising, Milton & Ethington and Plante, Hartz, Smith & Thompson

[57] ABSTRACT

A continuous-path numerical system controls the position of the cutter of a lathe with respect to the workpiece and the rate of rotation of the work spindle in accordance with a series of numerical commands encoded on a punched tape. Each command, in addition to position information, includes information relating to the desired rate of movement of the cutter over the workpiece in surface feet per minute and the desired rate of advancement of the cutter in terms of inches per revolution. The commands controlling the position of the cutter with respect to the center line of the spindle are continuously monitored and the quantity representative of the commanded separation is divided into the programmed surface feet-per-minute number to derive a number used to control the spindle motor drive. This system additionally calculates a feedrate number based on the incremental distances of motion along the X and Z axes called for by a particular command and the inches per revolution number. A pulse train generated by a transducer which senses the rate of rotation of the spindle is multiplied by this feedrate number to derive command pulse trains for DDA-type interpolators which generate control signals for the X and Z axes.

15 Claims, 6 Drawing Figures

INVENTOR.
Hymie Cutler

NUMERICAL CONTROL SYSTEM FOR A LATHE

BACKGROUND OF THE INVENTION

1. Field of the Invention

This invention relates to contouring numerical control systems for lathes, and more particularly to such systems wherein the input information includes information relating to the desired rate of motion of the cutter with respect to the workpiece surface and the rate of advancement of the cutter with respect to the spindle rotation. These inputs are used along with commanded increments of motion to derive control for the lathe spindle speed and the cutter motion velocity.

2. Prior Art

Contouring-type numerical control systems for machine tools operate to control the motion of the machine cutter with respect to a workpiece through a path which is defined by a sequence of motion segments. These segments are encoded in numerical form on a storage media such as a punched tape as a series of command blocks, each of which calls for a particular segment of motion of the controlled machine parts along a straight line or a circular or parabolic arc. Each block of information defines the nature of a path segment, and generally its ends points, in terms of coordinates along at least two mutually perpendicular axes. The system includes a servo drive for each controlled axis and means for generating appropriate control signals for the drives from the input numerical data, so that the controlled parts are moved through the prescribed path.

In addition to controlling the path that the cutter takes with respect to the workpiece, it is necessary to achieve control over the rate of motion of the cutter so that the operation is performed in the minimum time consistent with avoiding damage to either the tool or the workpiece or excessive wear on the tool due to overheating. Conventionally this rate control is achieved by encoding a feedrate number with each motion block on the input tape. This number may be used to directly control the rate of generation of the control signals, or it may be employed along with the commands for incremental motion along the various axes to calculate a "Feedrate Number" that is used to control the rate of generation of the control signals. Additionally, in machines such as lathes or mills which have a rotary spindle, a command block contains a number which controls the rate of rotation of that spindle. These feedrate and spindle speed numbers are chosen by the programmer so that the machine will be operating in an optimum manner for the segment being cut, taking into consideration all pertinent quality and economic criteria.

Several problems are presented by this form of specification of the feedrate and spindle speed numbers. First, the actual calculation of the numbers is quite complicated so that in the case of all but the simplest parts, hand programming is sufficiently lengthy that off-line computer processing becomes a virtual necessity. Second, in order to maintain optimum machine operation without varying spindle speed or feedrate number during the formation of a particular segment it is necessary to divide the total motion into a large number of very small segments. This lengthens the computation time and when the tape must be edited to debug a program or optimize feeds and speeds a large number of command blocks must be changed raising the possibility of additional errors being introduced by this reprogramming. Additionally, the values of speed and feed included with the block are chosen on the assumption that the machine will be operating at the commanded rates, but the spindle drive will generally respond very slowly to changes in commanded speed so that the resultant operation may not be proceeding in the optimum manner.

In order to avoid these shortcomings of the system of designating the desired feedrate and spindle speeds in a command block it has been suggested that provision be made to modify programmed speeds and feeds as a function of the actual machine operation. In one scheme used on a lathe, two potentiometers are provided which are driven by the motion of the transverse machine slide. One is used to attenuate the programmed spindle speed as the distance between the cutter and the workpiece center of rotation increases, in order to maintain the rate of movement of the cutter over the tool at approximately a constant rate, and the other is used to attenuate the programmed feedrate. The result is that as the radius of the cut increases, both the spindle speed and the feedrate decrease. This provides a relatively constant rate of cutter motion with respect to the workpiece and the chip-load. However, this system still does not correct for lags of spindle speed in response to a commanded change, and it requires additional mechanism which is subject to failure and drift of calibration.

SUMMARY OF THE INVENTION

The present invention contemplates a system for controlling the rate of motion of the cutter of a lathe with respect to the workpiece which greatly simplifies the part programming, eliminates the need for extra mechanism, and adjusts the control signals to the actual machine performance so that an optimum cutting operation is achieved.

Broadly, in a preferred embodiment of the invention the part program used with the system specifies, in addition to the geometry of the commanded motion, the desired relative speed between the cutter and the workpiece in surface feet per minute (SFM) as well as the inches of feed per spindle revolution in terms of the vector distance of cutting-tool advance per spindle revolution (IPR). These SFM and IPR only need to be programmed when they are to be changed in value. The control continuously monitors the commands which control the distance between the cutting tool and the center of rotation of the workpiece by algebraically summing the command pulses associated with the motion of the cutter normal to the workpiece center line of rotation. In alternative systems the motion of the cutter itself, rather than the motion commands, could be monitored by a suitable transducer to derive this number. This dimension is equal to the radius of the workpiece at the point of the cut. The control divides this radius figure into the programmed SFM to derive a control signal for the spindle drive motor. As the workpiece radius increases the spindle drive speed decreases in order to achieve a constant value of the velocity of the cutter over the workpiece.

A transducer provides output pulses for each increment of rotation of the workpiece spindle to generate a pulse train. This signal, proportional to spindle speed, could be derived from the spindle speed command signals, rather than a transducer, in alternative embodiments. This latter approach simplifies programming and lowers hardware costs, but sacrifices control accuracy since it neglects differences between actual and commanded spindle speed. In the preferred embodiment the transducer output pulse train is multiplied by a feedrate number which the control calculates from the IPR number and the incremental motion commands for the two controlled axes of the feedrate number. The output of the multiplier which accepts the spindle pulses and the feedrate number constitutes a pulse train which is used to control the rate of operation of the interpolator which commands the X and Z motions on the basis of the encoded incremental commands. In this manner the commands are performed at such rates as to produce a vector motion rate which is a direct function of both the rate of spindle rotation and the feedrate number so as to achieve a constant feedrate in terms of inches per revolution. Since the rate of production of the lathes on which such numerical controls are employed is generally limited by the capabilities of the cutting tool, programming a motion in terms of SFM and IPR will achieve the maximum cutting rate possible without excessive damage or tool wear. These SFM and IPR figures are relatively constant from block to block and since they employ a minimum amount of calculation they substantially simplify programming and allow hand programming as opposed to computer programming with a broad variety of parts.

Other objects, advantages and applications of the present invention will be made apparent by the following detailed description of a preferred embodiment of the invention. The description makes reference to the accompanying drawings in which.

Figure 1A:
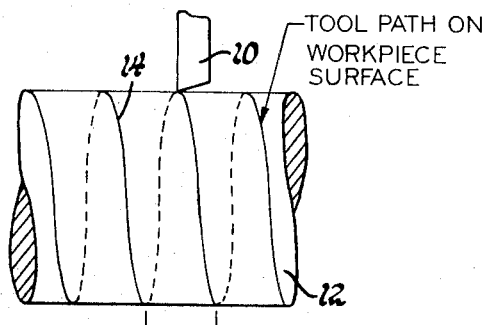
FIG. 1A is an illustration of a cutter and workpiece illustrating the definition of inches per revolution or IPR.
Figure 1B:
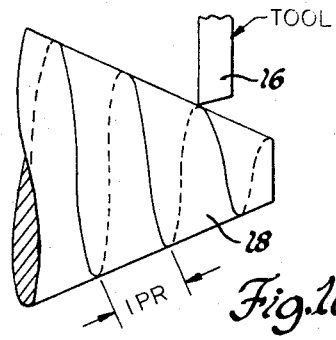
FIG. 1B is an illustration of a second form of workpiece and cutter further illustrating the definition of IPR.

As stated previously, the present invention is applicable to lathes and operates to control the motion of the cutter of the lathe with respect to the workpiece so as to undergo motions commanded in input blocks at rates determined by further information encoded in the input blocks in terms of IPR and SFM. FIGS. 1A and 1B illustrate the definition of IPR and FIG. 2 illustrates the definition of SFM.

In FIG. 1A, the cutter 10 is illustrated as forming a cylindrical cut along a workpiece 12. The helical path of the cutter with respect to the workpiece is illustrated by line 14 and the axial motion of the cutter as the workpiece undergoes 1 full revolution, i.e. the lead of the cut, is equivalent to IPR. In FIG. 1B, the cutter 16 is illustrated as forming a conical cut on a workpiece 18 by a combination of motion parallel to the axis of revolution of the workpiece and motion normal to that axis. IPR is again the lead of the helical cut formed but as illustrated in this figure the IPR is a vector distance measured in terms of the resultant linear motion of the cutting tool. The force on the tool cutting edge per unit depth of cut for a given workpiece material is proportional to the area of shear which is the product of the IPR and depth of cut. Thus by controlling the IPR, the cutting force on the tool will be controlled.

Figure 2:
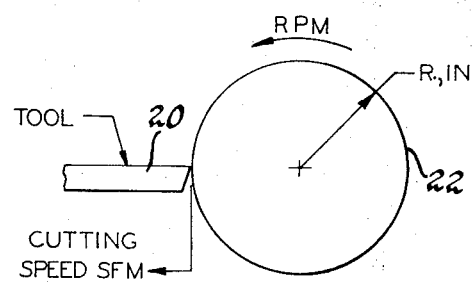
FIG. 2 is a diagram of a workpiece and cutter illustrating the definition of surface feet per minute or SFM.

In FIG. 2 a cutter 20 is shown as forming a cut on a workpiece 22 which is viewed along its rotational axis. SFM is simply the rate of motion of the cutter over the workpiece surface in surface feet per minute. The heat generated in a tool cutting edge for a given workpiece material, will be greatly influenced by the rate of abrasion of the workpiece over the tool which is measured by SFM. Thus, by controlling the SFM, the rate of the tool wear can be controlled.

Figure 3:
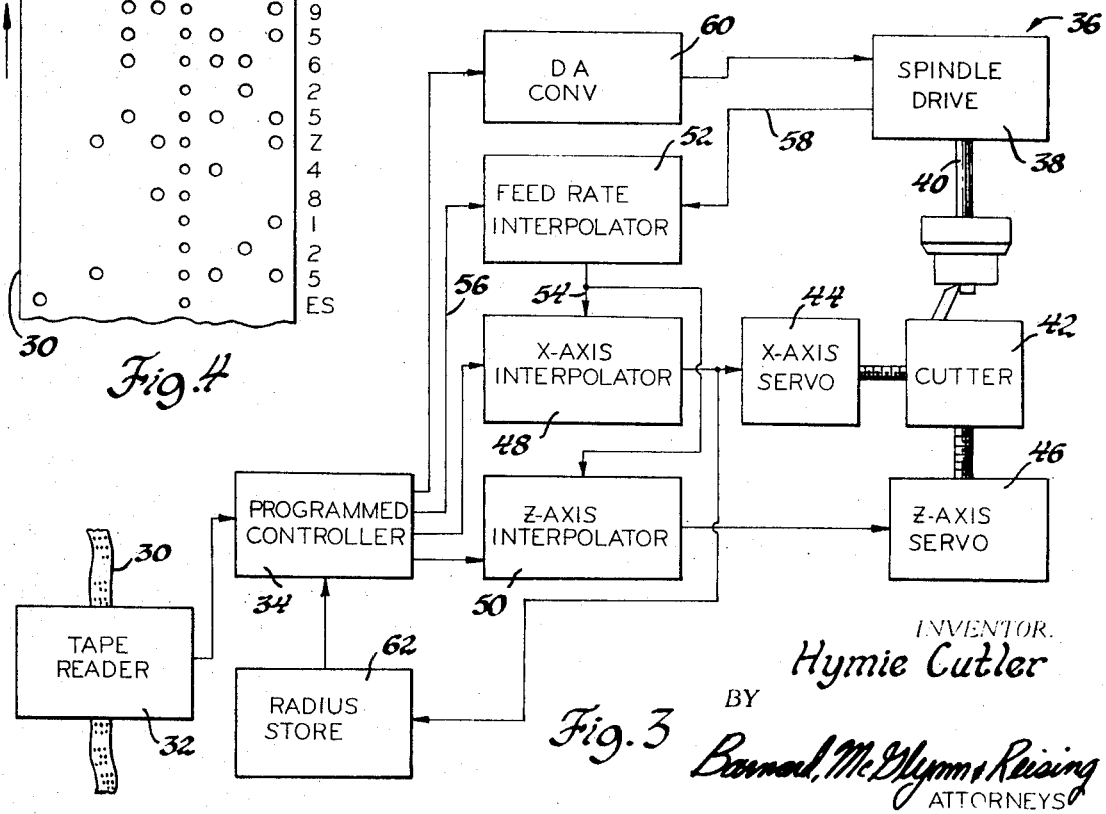
FIG. 3 is a broad block diagram of a control system forming the preferred embodiment of the present invention.

The broad arrangement of a control system formed in accordance with the present invention is disclosed in FIG. 3. Input data constituting the necessary path information for the desired operation of the system is encoded on a punched tape 30 which is sequentially provided to a tape reader 32. The signals representing the output of the reader 32 are provided to a programmed controller 34. The controller constitutes an appropriately programmed general purpose computer in the preferred embodiment of the invention. In alternate embodiments the controller might be permanently wired. The operation of the controller 34 will be described in functional terms in sufficient detail to allow a systems analyst, experienced in real-time systems, to design an appropriate program for any computer which will cause it to perform the desired operations, or to allow a skilled digital circuit designer to develop hardwired apparatus for performing these functions.

In the preferred embodiment of the invention, a Micro Systems Model 810 computer is programmed to perform the controller function. The operating instructions for this computer can be found in "Micro 810 Computer Reference Manual," copyright 1969 by Micro Systems, Inc. of Santa Ana, Calif. This computer is in the "mini" class and larger and faster computers might be employed in the system at higher hardware cost.

The broad function of the controller is to receive the input information from the tape reader 32, to operate upon that information in a manner which will be subsequently described, and to provide suitable output control signals for devices which drive the controlled machine, generally indicated at 36.

In the preferred embodiment of the invention the machine constitutes a lathe which includes a spindle drive 38, operative to rotate a spindle 40; and a cutter 42 which is movable normally to the axis of rotation of the spindle by X axis servo 44, and parallel to the axis of rotation of the spindle by a Z axis servo 46. The controller 34 provides X command numbers to an X axis interpolator 48 and a Z axis interpolator 50. These interpolators may be of the digital-differential-analyzer type disclosed in U.S. Pat. No. 3,128,374, and they operate to provide trains of output pulses at rates proportional to their input numbers. The output pulse train from the X axis interpolator 48 is provided to the X axis servo 44 while the command pulse train output of the Z axis interpolator 50 is provided to the Z axis servo 46. The X and Z axis servos 44 and 46 may be of the phase-analog type described in U.S. Pat. No. 3,011,110, which provide one increment of output motion for each pulse received.

The rate of generation of the output pulses by the interpolators 48 and 50 is controlled by a feedrate interpolator 52, that generates a pulse train which is provided to both of the interpolators on line 54, and controls their rates of operation. The output pulse train on line 54 is generated by the feedrate interpolator, which may also be of the type disclosed in U.S. Pat. No. 3,128,374, as a function of a feedrate number provided to the interpolator 52 from the programmed controller on line 56, and a pulse train provided to the interpolator from the spindle drive 38 on line 58. The interpolator effectively multiplies the pulse train provided on line 58 by a fractional quantity represented by the number provided on line 56, to provide an output pulse train on line 54 having fewer pulses than the input pulse train on line 58.

The pulse train on line 58 is generated by a transducer associated with a spindle drive which produces an output pulse for each incremental rotation of the spindle. The rate of rotation of the spindle drive 38 is controlled by information provided from the controller 34 via a digital-to-analog converter 60.

The pulses provided by the X axis interpolator are also fed to a radius store unit 62 which is a reversible counter that effectively maintains a value proportional to the normal distance of the cutter from the workpiece axis of rotation, or the radius of the cut being formed. This value is provided to the programmed controller 34 and is used by the controller to calculate the value of the control signal provided to the spindle drive.

Figure 4:
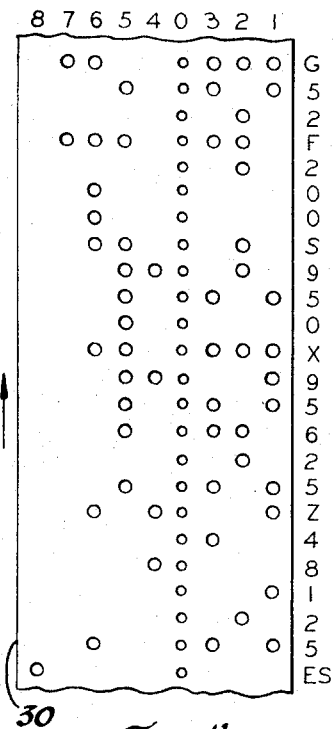
FIG. 4 is an illustration of a section of control tape containing a typical command block for control of the machine of the preferred embodiment.

The input information to the system on tape 30 is arranged as a sequence of blocks, each commanding one increment of motion, and FIG. 4 illustrates a typical block. The punched tape 30 is of the conventional eight-channel variety and the tape reader 32 senses one line across the width of the tape at a time, with each line being representative of a particular character in the coding system. Assuming that the tape moves into the reader 32 in the upward direction, as viewed in FIG. 4, the first three lines are coded to represent G-52. This code indicates to the controller that the feed information contained in the following block is encoded in terms of SFM and IPR, as opposed to more conventional feedrate identification systems. The next four lines contain the codes for F 200. F is the code symbol for the IPR number and the figure 200 expresses the IPR rate in ten-thousands of an inch per revolution. Thus, the IPR number is 0.02 inches per revolution. The next four lines decode as S 950. S is the SFM number in tenths of a foot per minute. Thus the SFM number is equal to 95 feet per minute. The next six lines decode as X 95625 which is the commanded extent of the X motion in the basic motion increment of the machine which is ten thousandths of an inch and accordingly an X excursion of 9.562 inches is called for. The next six lines call for a Z excursion of 4.8125 inches. The last line across the width of the tape represents end of block and acts to separate the various blocks of information on the tape.

Figure 5:
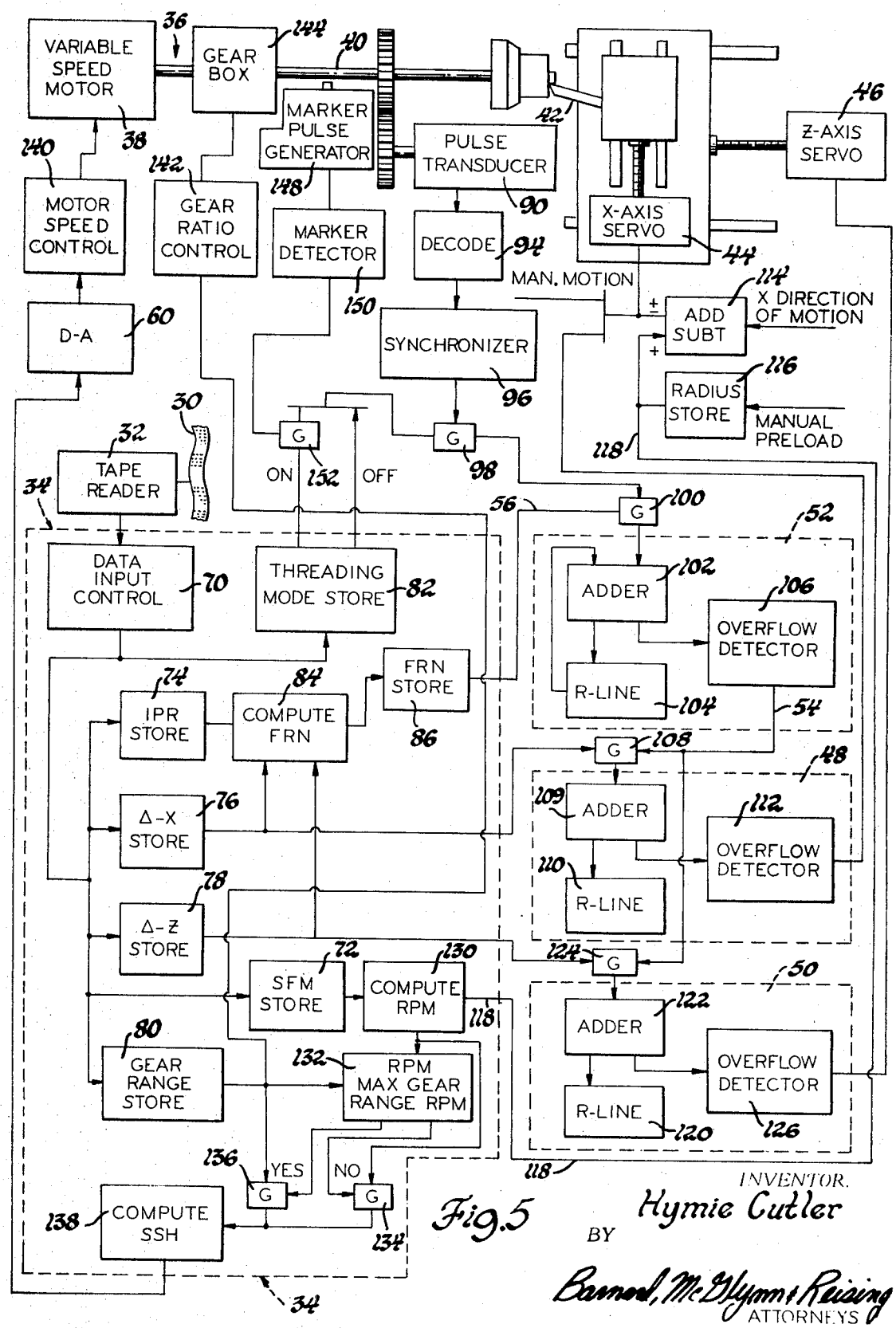
FIG. 5 is a more detailed block diagram illustrating the preferred embodiment of the invention.

FIG. 5 is a detailed block diagram illustrating the operation of the system. In that diagram certain of the blocks contained within the programmed controller 34 represent functional states of the controller as opposed to actual physical or electrical positions within the controller.

Information provided to the controller 34 from the tape reader 32 is decoded by a data input control section 70 which directs the information to a number of stores, depending upon the address. The S number is provided to an SFM store 72; the F number to an IPR store 74; the delta X number to store 76, and the delta Z number to a store 78. Other information blocks may contain codings indicating the desired gear range of the spindle drive, and such information is provided to a gear range store unit 80. All of this information is stored until replaced by equivalent information from subsequent blocks. The tape may also contain information indicating that the machine is to be in the threading mode and this information is provided to the storage unit 82.

One of the functions performed by the controller 34 is to calculate a feedrate number which is provided to the feedrate interpolator 52 via line 56. This computation is performed on the basis of the contents of the IPR store 74, the delta X store 76, and the delta Z store 78. The computation is illustrated as being performed in a unit 84, but is actually performed by the computer components under program control at appropriate points in the computer's operational cycle and not at a specific location within the system. The computation consists of solving the equation $$FRN = IPR\ K / \sqrt{\Delta X^2 + \Delta Z^2}$$

where $K$ is a constant. This number is calculated for each command block of information and is provided to a store unit 86 which maintains it during the time of operation of that block.

The feedrate number used in connection with a pulse train derives from a transducer 90 which is connected to the machine spindle 40 by gearing 92. The transducer 90 provides an output pulse for each increment of rotation of the spindle. The transducer may be of the type disclosed in U.S. Pat. No. 3,069,608 which has three brushes so that the direction of the rotation of the spindle may be interpreted from the occurrence of pulses on these brushes. The decoder unit 94 performs this interpretation and cancels redundant pulses which may have occurred as a result of vibration of the unit, and provides its output pulse train to a synchronizer 96 which brings the pulse timing into accord with the overall rate of operation of the system.

The output of the synchronizer 96 passes through a gate 98 which is normally open, and will later be discussed in detail, and is then used to condition a gate 100 which receives the feedrate store. Upon the occurrence of each pulse in the input train to the gate 100, the number contained within the feedrate store is provided to a serial adder 102 contained within the feedrate number interpolator 52. This number is added to a quantity contained in an R line 104, the contents of which are continually recirculated through the adder 102. The occurrence of overflow pulses from this addition process is detected by unit 106 and used to generate a train of output pulses which act as add commands for the X and Z interpolators 48 and 50.

In connection with the X interpolator 48, the contents of the delta X store are provided to an adder 109, through a gate 108, each time a pulse occurs on line 54 from the feedrate interpolator. The contents of an R line 110 are continually recirculated through the adder 109 and overflows from the addition process are detected by unit 112 and provided to the X axis servo 44. The motion of the cutter 42 in the X direction is thus controlled by these pulses.

These X command pulses are also provided to a serial adder/subtractor unit 114 through which the contents of a radius store unit 116 are regularly recirculated. For each X command pulse that is provided to the unit 114 an addition or subtraction is made from the contents of the radius store unit 116 depending upon the sign of an input to the unit 114 from the controller 34 which indicates the commanded direction of motion of the X servo. A number is manually preloaded into the radius store at the beginning of the operation which indicates the normal distance of the cutter nose from the axis of rotation of the spindle. This preset number is modified as X command pulses are generated in order to maintain a value in the radius store 116 which is proportional to the normal cutter distance, or the radius of a cut being formed by the lathe tool. This signal is provided to the controller 34 via line 118 and will be used in a manner to be described in order to control the spindle drive motor speed.

The Z command pulse train is derived by the interpolator 50 by adding the contents of the delta Z store 78 into the contents of an R line 120, which is recirculated through an adder 122, each time an add command pulse is received from line 54 via gate 124. An overflow detector 126 generates the Z command pulses which are provided to the servo 46.

The system that controls the speed of rotation of the spindle utilizes the SFM number from the store 72 and the radius, provided on line 118 from the store 116. The system divides the SFM number by the radius number and multiplies by the constant of 6 divided by $\pi$, to provide an RPM signal which is stored in a location 130. This number is compared with the maximum spindle speed for the gear range stored in unit 80 by the general purpose computer. This function is indicated by the box 132.

If the computed RPM is less than the maximum RPM, gate 134 is activated, which allows the calculated RPM to be used in the computation of the spindle speed number. If the calculated RPM exceeds the maximum obtainable RPM at that gear range, a gate 136 is activated, allowing the maximum RPM to be used in the calculation of the spindle speed number. The spindle speed number is equal to whichever RPM is provided by the unit 132, divided by the maximum RPM as derived from store 80. The output of this calculation, which is identified in unit 138, is provided to the digital-to-analog converter 60 which generates an analog signal used by a motor speed control 140 to control the variable speed spindle drive 38.

The gear range store 80 is also used to control appropriate solenoids contained within a gear ratio control 142 to shift a gear box 144 which provides the actual output to the spindle.

Since this arrangement provides a very precise slide motion per spindle revolution, it is well adapted to generate the lead for single point cutting of threads. Commonly, cutting of threads requires more than one pass to realize the final depth. Each pass must start at the same point in the groove so as to create the desired thread form. To accomplish that a marker pulse generator 148 is associated with a spindle 40, and detects the rotation of a single point on the spindle and provides a marker pulse which thus occurs once each rotation. Associated electronics 150 operate on this pulse and provide it to a gate 152. When the thread mode store unit 82 contains a signal indicating that a thread is being cut, a second conditioning signal is provided to the gate 152 and the marker pulse is provided to the gate 98, allowing the spindle pulses to be provided from the pulse transducer 90 to the feedrate interpolator 52. When the threading mode store is off, the gate 98 is always conditioned so that the feedrate pulses are not delayed. With this arrangement, when a thread is being cut, the generation of interpolator pulses is always initiated at the same point relative to the rotation of the spindle.

In operation, after receiving a block of information of the type illustrated in FIG. 4, the system uses the existing contents of the store 116 and the contents of the SFM store 72 to generate a calculated RPM. Based on that RPM, as long as it does not exceed a maximum gear-range RPM, a spindle speed number is calculated, and is used to drive the spindle. A train of spindle pulses is then generated by the transducer 90 and is multiplied by the feedrate number which was calculated by the system on the basis of stored delta X, delta Z and IPR numbers, in the feedrate interpolator 52. The add command pulse train provided by the feedrate interpolator is used to control the rate of operation of the interpolators 48 and 50, driving the X and Y axes respectively. Motion of the X axis modifies the contents of the radius store 116 and thereby modifies the calculated RPM and the rate of rotation of the spindle. The system thus operates to perform the commanded motions at such rates as to realize the commanded SFM and IPR commands.

Having thus described my invention, I claim:

1. A control system for a lathe having a rotary spindle and a cutter positionable with respect to said spindle, comprising: a source of numerical information relating to a desired path of motion of the cutter relative to the spindle; a variable speed drive system responsive to said information for the spindle; a drive system for positioning the cutter relative to the spindle; means for generating a control signal which is a function of the distance of the cutter from the axis of rotation of the spindle; and means for providing said control signal to said variable speed spindle drive so as to cause the drive speed to be modified as a function of the said control signal.

2. The system of claim 1 wherein said control signal is directly proportional to the distance between the center of rotation of the spindle and the cutter and said variable speed spindle drive is controlled in inverse proportion to said control signal, whereby the rate of travel of the cutter over a workpiece supported on the spindle is maintained constant, independent of the separation of the cutter from the axis of rotation of the spindle.

3. The system of claim 1 wherein said source of numerical information includes information relating to the desired rate of travel of the cutter over the surface of a workpiece supported on the spindle, and wherein said variable speed spindle drive is controlled as a direct function of the value of said numerical information and as an inverse function of the control signal.

4. The system of claim 1 wherein said control signal is directly proportional to the distance of the cutter from the center of rotation of the spindle, the system includes a second source of numerical information relating to the desired rate of travel of the cutter over a workpiece supported in the spindle, means are provided for deriving a second control signal from said second numerical information, and said variable speed spindle drive is controlled as a direct function of the value of said second control signal, and as an inverse function of the control signal which is a function of the distance of the cutter from the axis of rotation of the spindle.

5. The control system of claim 1 wherein said drive system for positioning the cutter is controlled by signals derived from said source of numerical information so that the motion of the cutter along said desired path occurs at a rate proportional to the rate of rotation of the spindle.

6. The control system of claim 5 wherein said source of numerical information includes information relating to the rate of motion of the cutter and the drive system for positioning the cutter is caused to move at a resultant rate which is a direct function of said last said numerical information and a direct function of the rate of rotation of the spindle.

7. The system of claim 6 wherein the numerical information relating to the desired path of motion is expressed as a series of increments of motion and control signals for the drive system for positioning the cutter are generated, for each increment, at rates directly proportional to both the rate of rotation of the spindle and the numerical value of the rate control signal.

8. A control system for a machine having a rotary spindle and a cutter positionable with respect to said spindle, comprising: a source of numerical information relating to a desired path of motion of the cutter with respect to the spindle, such motion being expressed as a series of connected motion segments, the numerical information including information relating to the rate of travel of the cutter over a workpiece supported on the spindle; means for generating a first control signal which is the function of the distance of the cutter from the axis of rotation of the spindle; a variable speed drive system for the spindle; means for controlling said variable speed drive system as a direct function of said numerical information relating to the rate of motion of the cutter over the workpiece supported on the spindle, and in inverse proportion to the said first control signal; means for generating a second control signal proportional to the rate of rotation of the spindle; and means for controlling the motion of the cutter relative to the spindle in accordance with said numerical information and at a rate directly proportional to said second control signs.

9. The system of claim 8 wherein the cutter is movable along a pair of axes, one of which is normal to the axis of rotation of the spindle, and the other of which is parallel to the axis of rotation of the spindle, the numerical information relating to each segment of motion includes increments of motion along said two axes, interpolators are provided for each of the axes to generate control signals at rates proportional to the numerical information, and the interpolators are operated at rates proportional to the second control signal.

10. The system of claim 9 wherein the second control signal consists of a train of pulses generated by a transducer physically connected to spindle and operative to generate a pulse for each incremental rotation of the spindle.

11. The system of claim 10 wherein the interpolators operate to repeatedly add the numerical information relating to the motion segments along each axis into registers and to generate output pulses as a function of the overflow of said registers, and an addition is made into each of said registers each time a pulse occurs in the train of pulses generated by said transducer.

12. The system of claim 11 wherein the pulse train output of the transducer is multiplied by numerical information relative to the desired rate of motion of the cutter relative to the spindle axis to develop a second pulse train which is used to control the rate of operation of the interpolators.

13. A control system for a machine having a rotary spindle and a cutter positionable with respect to such spindle, comprising: a source of numerical information relating to the desired path of motion of the cutter relative to the spindle and the desired rate of travel of the cutter over the surface of a workpiece supported on the spindle; means for rotating the spindle at a rate which is a direct function of the commanded rate of travel of the cutter over the surface of a workpiece supported on the spindle and an inverse function of the normal distance between the cutter and the center of rotation of the spindle; and means for controlling the position of the cutter relative to the spindle so as to move the cutter through the path commanded by said numerical information at a rate proportional to the rate of rotation of the spindle.

14. The control system of claim 13 wherein the position of the cutter relative to the spindle is controlled by means which includes at least one digital servo operative to move the cutter along an axis normal to the center of rotation of the spindle and the system includes means for generating a train of control pulses from said numerical information for powering said digital servo, and a reversible register operative to receive said train of pulses and to algebraically store them so as to maintain a number proportional to the distance of the cutter from the center of rotation of the spindle along normal lines.

15. The control system of claim 14 wherein means are provided for presetting the contents of said register with a number proportional to the normal distance between the cutter and the center of rotation of the spindle prior to the initiation of utilization of a section of numerical information.

* * * * *